(12) United States Patent  (10) Patent No.: US 8,920,045 B2
Chayun et al.  (45) Date of Patent: Dec. 30, 2014

(54) SYSTEMS AND METHODS FOR PROVIDING CONTROLLED INDEPENDENT FLOAT MECHANISMS FOR OPTICAL CONNECTORS

(75) Inventors: Idan Chayun, Ramat Gan (IL); Amir Geron, Modi'in (IL); Moti Cabessa, Netanya (IL)

(73) Assignee: Compass Electro Optical Systems Ltd., Netanya (IL)

( * ) Notice: Subject to any disclaimer, the term of this patent is extended or adjusted under 35 U.S.C. 154(b) by 0 days.

(21) Appl. No.: 13/468,606

(22) Filed: May 10, 2012

(65) Prior Publication Data

US 2013/0301992 A1  Nov. 14, 2013

(51) Int. Cl.
 *G02B 6/36* (2006.01)
(52) U.S. Cl.
 USPC .............................................. 385/77; 385/70
(58) Field of Classification Search
 CPC ... G02B 6/4292; G02B 6/3893; G02B 6/3821
 USPC ............... 385/53–94; 439/312, 448–474, 489
 See application file for complete search history.

(56) References Cited

U.S. PATENT DOCUMENTS

| 4,547,039 | A * | 10/1985 | Caron et al. ..................... 385/88 |
| 2007/0237472 | A1 * | 10/2007 | Aronson et al. .............. 385/101 |
| 2007/0286555 | A1 * | 12/2007 | Kiani et al. ..................... 385/72 |

* cited by examiner

*Primary Examiner* — Mark Robinson
*Assistant Examiner* — Zachary A Nemtzow
(74) *Attorney, Agent, or Firm* — Wilmer Cutler Pickering Hale and Dorr LLP

(57) ABSTRACT

Systems and methods are provided for controlling optical connectors. A float mechanism for controlling an optical connector can include a pin, a first and a second shaft assembly, and a base. The base can include a first and a second cantilever, and a housing, that defines an opening for receiving the pin. The base can receive the two shaft assemblies. The float mechanism can further include a tab with multiple surfaces and be configured to receive the pin.

20 Claims, 28 Drawing Sheets

SYSTEMS AND METHODS FOR PROVIDING CONTROLLED INDEPENDENT FLOAT MECHANISMS FOR OPTICAL CONNECTORS

FIELD OF THE INVENTION

The present invention relates to optical connector assemblies and particularly to methods and systems for mounting multiple connecting devices to a single substrate with an absolute float movement there between.

BACKGROUND OF THE INVENTION

Backplane optical connectors are made of a few basic components. A backplane adaptor can hold one or more optical connectors, and is passive in the system's backplane. A daughter card adaptor can also hold one or more optical connectors, and is inserted into the system with the daughter card. The optical connector can include i) an optical ferrule, which provides accurate alignment of the optical fibers interface surface, ii) optical fibers, and iii) a connector assembly, which is a carrier for the ferule, and allows connection to another connector.

When inserting the daughter card inside the system the backplane adaptor "receives" the daughter card adaptor. The backplane adaptor and the daughter card adaptor align with each other. All optical connectors inside the adaptors also align, and therefore ferrule face contact pressure is achieved. Both adaptors latch to one another in a certain force, which can vary with different connectors because different ferrules require different optimal face pressures.

After latching, the adaptor can float to release the forces from the daughter card allow electrical connectors to engage.

Backplane optical connectors usually have two independent mechanisms: an optical latch mechanism and a float mechanism. The optical latch mechanism is used to lock two optical connector ferrules of the optical connector in a correct position against a constant load. The performance of the optical connector ferrule depends on the surface contact force when the ferrule is connected. The latching mechanism ensures constant force when the two ferrules are locked.

The float mechanism is used to address mounting tolerances in backplane optical connectors. Additionally, the float mechanism can isolate the optical mate force in the connector from the backplane and the daughter card printed circuit board ("PCB"). This isolation assures endurance of the system. Isolating the force from the daughter card, results in the card injectors also being isolated from the force.

Connecting a fiber optics connector requires a mate force between the ferrule faces and also guidance between the connectors to enable alignment between the ferrules. During an insertion, an optical connector can self-align without any additional manual operation. The alignment is based on the relative position of the backplane adaptor and the daughter card adaptor, which is rigidly connected to the daughter card. When the daughter card is inserted into the system, it is desirable to have sufficient guidance to allow mate between the backplane adaptor and the daughter card adaptor. However, connecting multiple optical connectors on the same daughter card requires a float to ensure that all optical connectors are mated.

A float mechanism which is embedded in the backplane optical connector has major limitations. Since the backplane optical connector is limited in physical dimensions (area and volume), when the float mechanism is embedded in the backplane optical connector, it has to be as small as possible and manufactured under very strict tolerances in order to work. The area and volume limitations further prohibit the use of friction lowering devices such as ball bearings. This results in complicated and expensive designs. Another limitation of an embedded float mechanism is that every connector has a limited float stroke.

Therefore, there is a need for a float mechanism that is outside of the backplane optical connector. Such a float mechanism can have manufacturing tolerances which can be less strict, when compared to embedded float mechanisms. An additional advantage of a float mechanism that operates outside of the backplane optical connector is that it can be implemented in connection with any "Push-in, Pull out" connector, which further allows additional flexibility.

Such a float mechanism can achieve a better controlled float, since it is possible to implement ball bearings, springs, cantilevers or any other solution that can not fit inside a standard connector. Further it allows different strokes for the same connector, resulting in a more flexible system and that further allows connectivity of multiple optical connectors.

Such a float mechanism can be separated from the optical connectivity mechanism, in terms of alignment and latch. This allows additional flexibility to the connectors that can be used.

SUMMARY OF THE INVENTION

According to aspects of the present invention, a float mechanism for controlling an optical connector comprise a pin that has a first end and a second end, a first shaft assembly and a second shaft assembly and a base. The base can comprise a first cantilever and a second cantilever, and a housing that has a first side and a second side, the first side connected to the first cantilever and the second side connected to the second cantilever. The housing can further define an opening configured to receive the pin and the housing further defining a plurality of threads. The base can defining a first shaft assembly opening for receiving the first shaft assembly and a second shaft assembly opening for receiving the second shaft assembly. The float mechanism can further comprise a tab that includes a first and second preload surface, a first and second float force surface, a first and second residual force surface and a first and second preload chamfer, the tab configured to receive the first end of the pin.

According to alternatives aspects of the present invention, a method for connecting an optical connector comprises providing a float mechanism for controlling an optical connector comprising a pin that has a first end and a second end, a first shaft assembly and a second shaft assembly and a base. The base can comprise a first cantilever and a second cantilever, and a housing that has a first side and a second side, the first side connected to the first cantilever and the second side connected to the second cantilever. The housing can further define an opening configured to receive the pin and the housing further defining a plurality of threads. The base can defining a first shaft assembly opening for receiving the first shaft assembly and a second shaft assembly opening for receiving the second shaft assembly. The float mechanism can further comprise a tab that includes a first and second preload surface, a first and second float force surface, a first and second residual force surface and a first and second preload chamfer, the tab configured to receive the first end of the pin. The method further comprises connecting the optical connector to the second end of the pin.

BRIEF DESCRIPTION OF THE DRAWINGS

The present invention will be further understood and appreciated from the following detailed description taken in conjunction with the drawings in which.

DETAILED DESCRIPTION OF THE INVENTION

Figure 1:
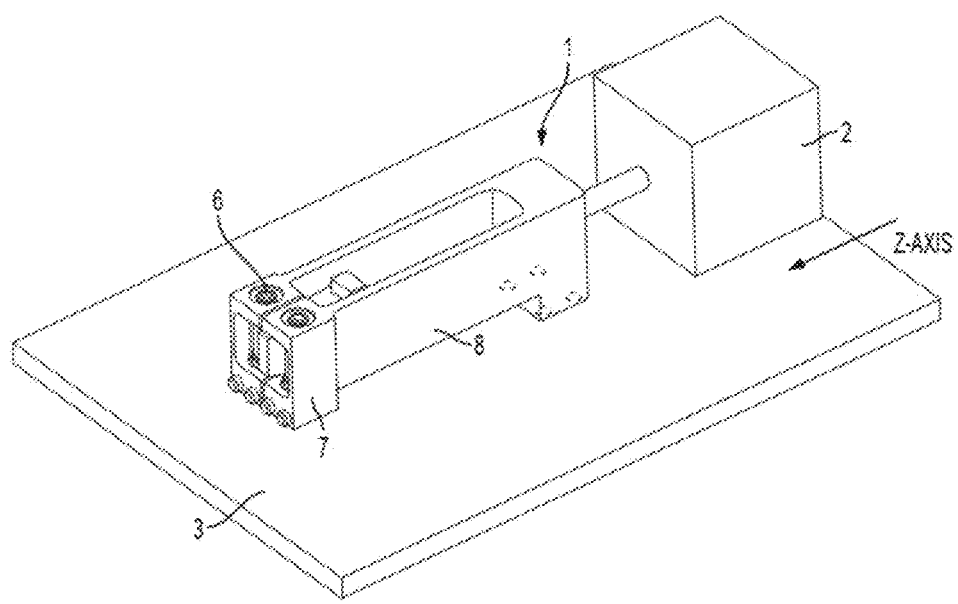
FIGS. 1-4 are illustrations of a controlled independent float mechanism according to embodiments of the present invention.
Figure 2:
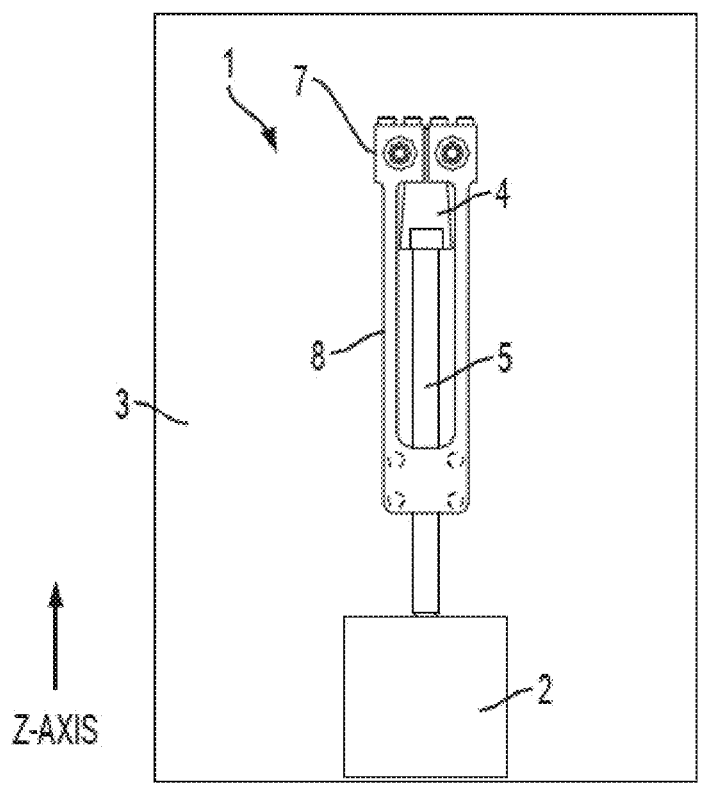

A mechanism providing a controlled independent float for any optical connector is provided. FIGS. 1 and 2 show a perspective view and a top view of a float mechanism 1, respectively, according to aspects of the present invention. A float mechanism base comprises two cantilevers 8 and two shafts 7, and is supported by four ball bearings 6. The float mechanism 1 also comprises an oblique tab 4 between the two shafts 7. The width of the tab 4 can be selected to determine the preload of the cantilevers 8. The float mechanism 1 also comprises a back pin 5 which is connected at a first end with the tab 4 and at a second end with an optical connector. FIG. 1 also shows the float direction (Z-axis) and a representation of the optical connector 2. The optical connector 2 can be attached directly to the back pin 5 or through another guidance mechanism.

In FIG. 1 the float mechanism 1 is in a preload initial state. When the optical connector is inserted to the float mechanism, pressure is moved through the back pin 5 to the tab 4, which in turn transfers the pressure to the shafts 7, and subsequently to the cantilevers 8, using a controlled angle. The angle defines the maximum latching force for optical mate as needed by a particular optical connector. Every type of optical connector needs a different latching force. The latching force is optimized by the connector manufacturer to achieve the best optical connectivity performance.

In FIG. 2 the float mechanism 1 and the connector 2 are in an unmated position. Similar to FIG. 1, the float mechanism 1 is in a preload initial state.

Figure 3:
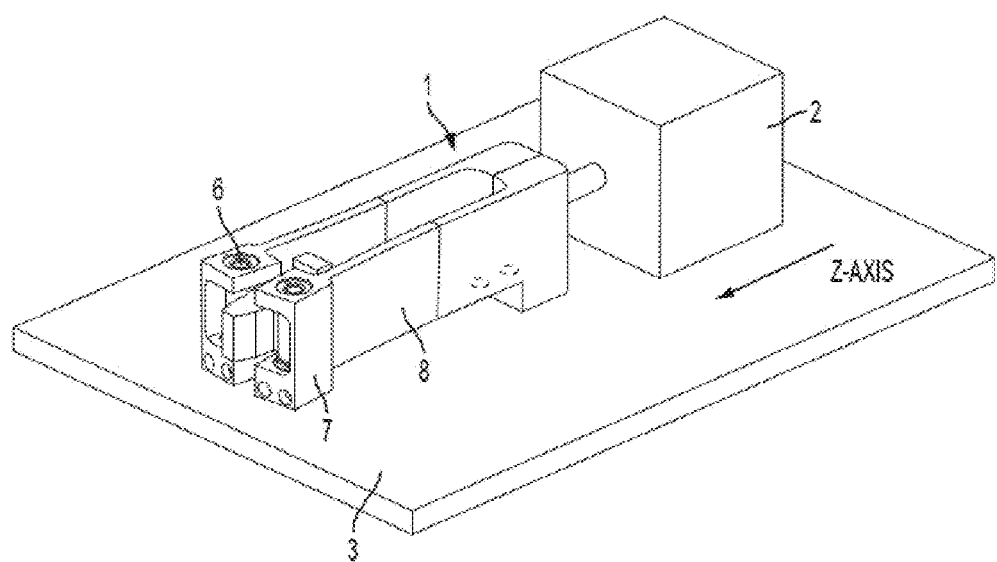
Figure 4:
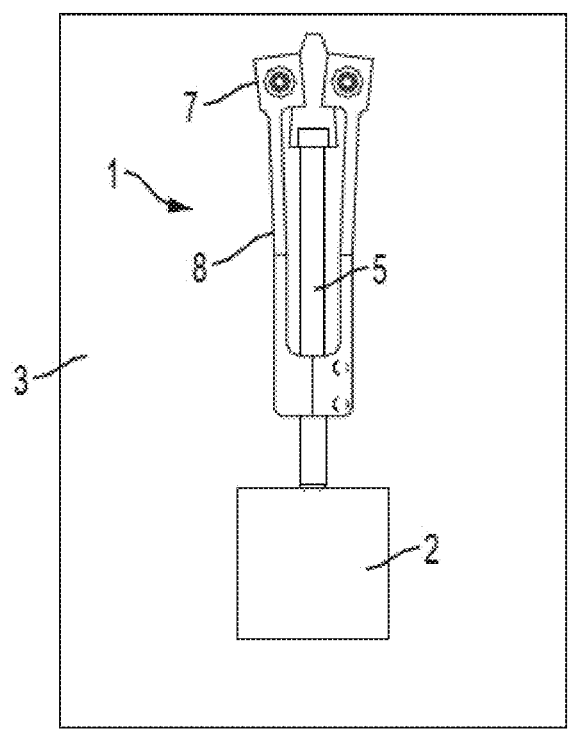

FIGS. 3 and 4 show a perspective and a top view of the float mechanism 1 in a mated position, respectively. As shown, the float mechanism is in a float state. After the tab overcomes a preload force, it is pressed forward along the Z-axis towards a different surface with a different angle. The new angle defines the residual force for each connector separately as needed.

Upon disconnection of the connector, the mechanism uses residual force to return to its unmated position to allow a new connection. The float mechanism according to embodiments of the present invention is not based on friction, and therefore is more reliable, more stable and allows a repetitive solution for connecting optical connectors.

According to alternatives embodiments of the present invention, the cantilevers can be replaced by external springs. The external spring load can replace the cantilever elasticity and can return the float mechanism to the mated position. In this case the cantilevers can be replaced with beams on frictionless axis that can rotate freely, but rigidly without flexing, in connections with a tension spring that provides similar force as the cantilevers.

Figure 5:
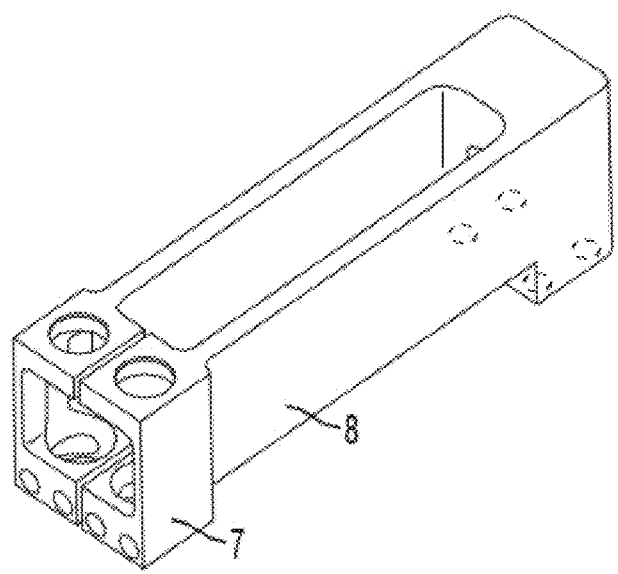
FIGS. 5-6 are exemplary illustrations of a controlled independent float mechanism base according to embodiments of the present invention.
Figure 6:
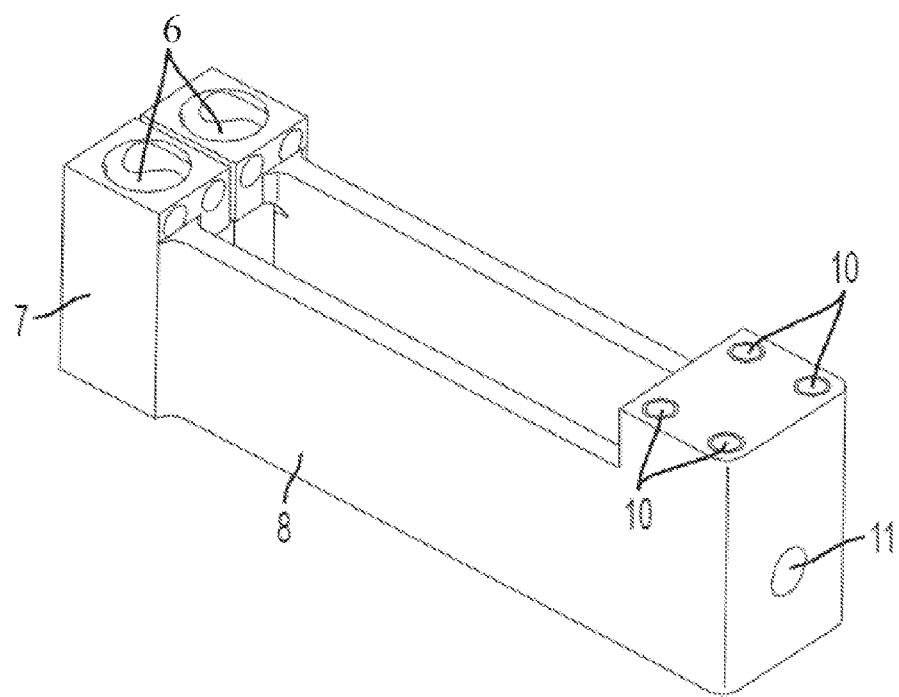

FIGS. 5-12 provide details of the components of the float mechanism according to embodiments of the present invention. Specifically, FIGS. 5 and 6 show a top and bottom view of float mechanism base, respectively. The float mechanism base can mount to the substrate using threads 10 at the bottom side of the float mechanism base as shown in FIG. 6. The float mechanism base can also provide guidance to the back pin using opening 11 and also hold both shafts 7 aligned with the tab. The two cantilevers can act as spring force to control the float force.

Figure 7:
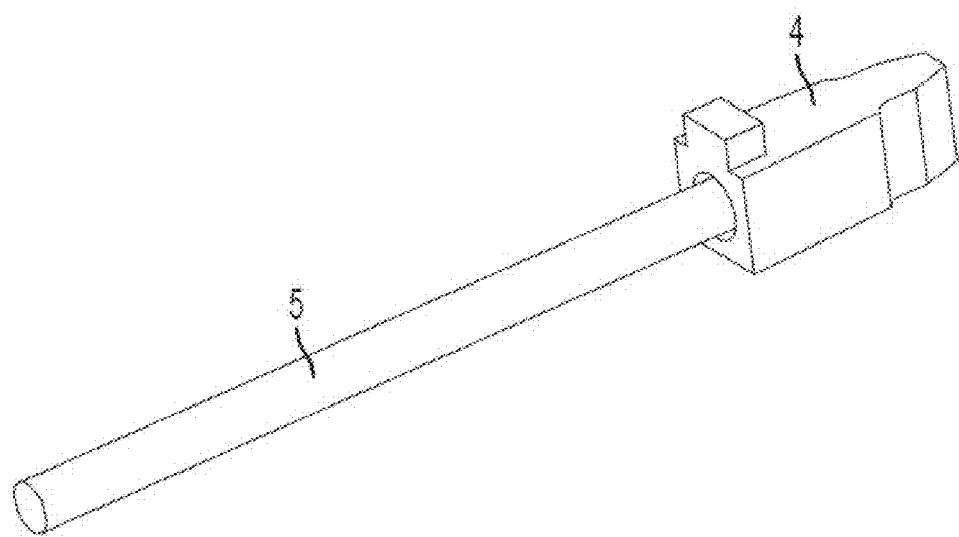
FIG. 7 is an exemplary illustration of a back pin and a tab assembly for a controlled independent float mechanism according to embodiments of the present invention.
Figure 8:
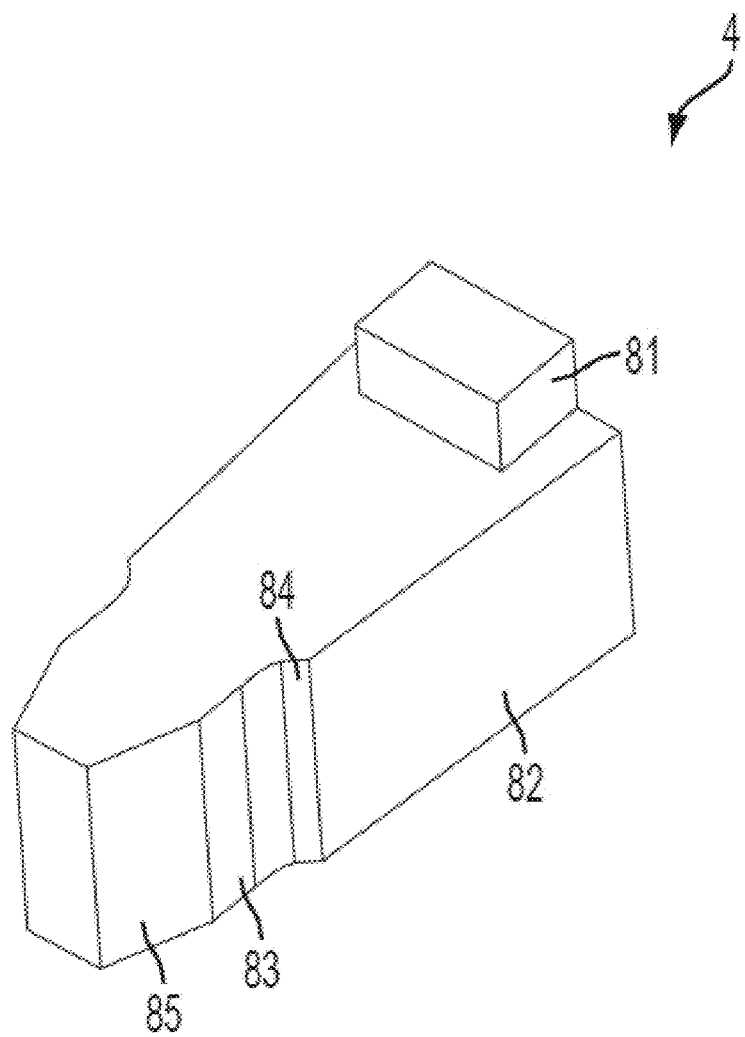
FIGS. 8-9 are exemplary illustrations of a tab according to embodiments of the present invention.
Figure 9:
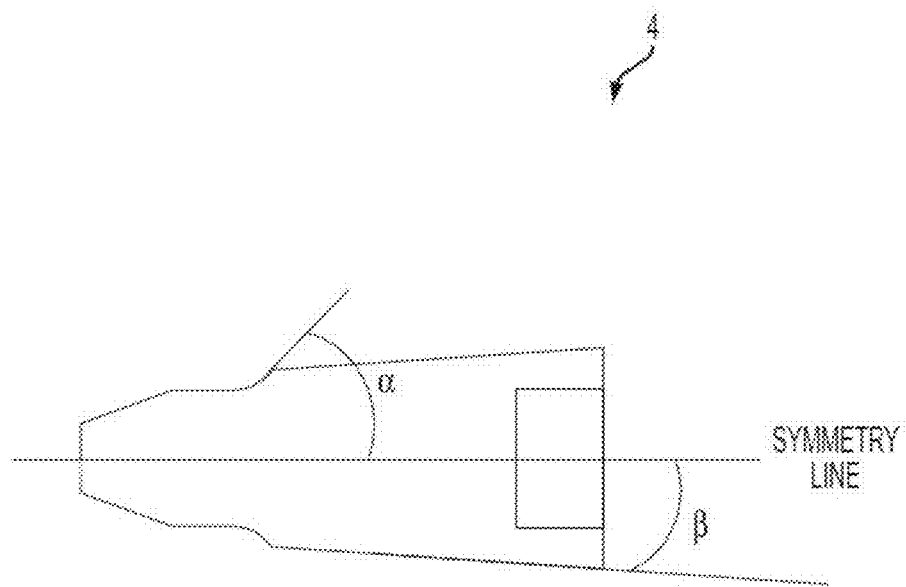

FIGS. 7-9 show exemplary illustrations of a back pin 5 and tab 4. The back pin 5 and tab 4 assembly shown in FIG. 7 can transfer the force from an optical connector towards the float mechanism. Specifically, the back pin 5 can transfer forces from the optical connector to the tab 4 and additionally serve as a guide for the Z-axis motion. According to aspects of the present invention, back pin 5 provides the main guidance to the tab 4.

FIG. 8 shows an exemplary tab 4, according to aspects of the present invention. Tab 4 has a hard stop 81, and two side. On each side the tab defines a preload surface 83, float force surface 84, a residual force surface 82, and a preload insertion chamfer 85. The preload insertion chamfer is configured to allow easy assembly.

Angle $\alpha$, shown in FIG. 9, controls the force required for the float mechanism to reach a float state. Angle $\beta$, also shown in FIG. 8, controls the residual force. FIG. 9 also shows the symmetry line of tab 4. The distance of the preload surface 83 with the symmetry line controls the preload force. Hard stop 81 is configured to limit the maximum float stroke. Angles $\alpha$ and $\beta$ control the force in the Z-axis. The cantilever force is transferred to the tab through the shafts. The shafts are circular; therefore, there is a single line of contact between a particular shaft and the tab thus the force direction is perpendicular to the tab surface in contact with the shaft. This perpendicular force can be split to a force in the Z-axis and a force in the X-axis (perpendicular to the Z-axis). Depending on the force direction ($\alpha$ or $\beta$), then the force in Z-axis is the cosine of angle $\alpha$ or angle $\beta$ multiplied by the cantilever force. The force in X-axis is the sine of angle $\alpha$ or angle $\beta$ multiplied by the cantilever force. The total force in the X-axis from both shafts is equal to zero due to symmetry, and the force in Z-axis is the float force when the shaft touches the float force surface and the residual force when the shaft touches the residual force surface.

Figure 10:
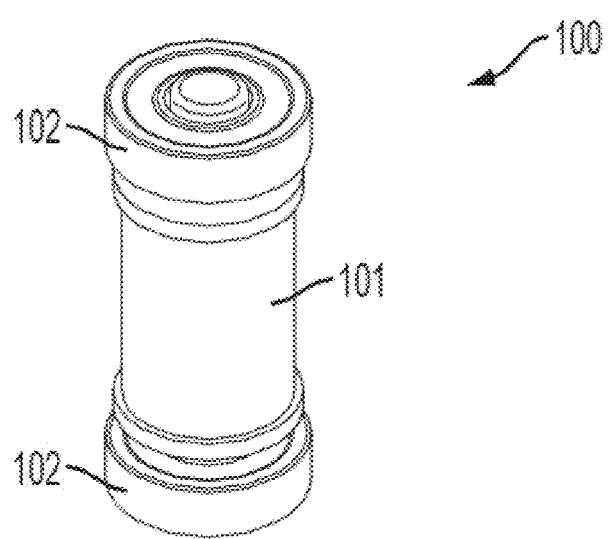
FIGS. 10-12 are exemplary illustrations of a shaft assembly according to embodiments of the present invention.
Figure 11:
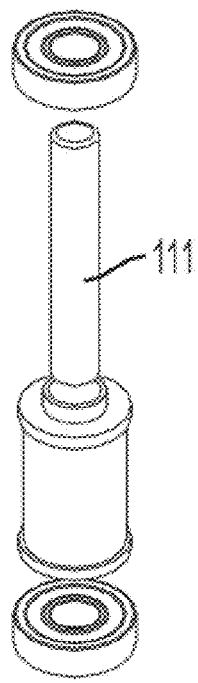
Figure 12:
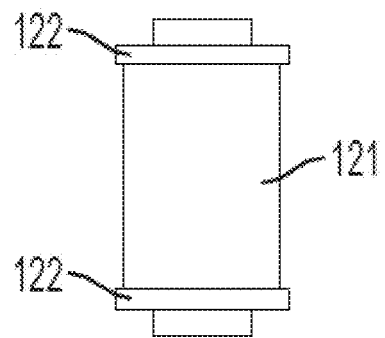

FIGS. 10-12 illustrate details of the shaft assembly of the float mechanism 1. The float mechanism has two shaft assemblies 100, as shown in FIG. 10, which are received in the float mechanism base. Shaft assemblies provide another link in force transfer in the float mechanism. Each shaft assembly has a shaft 101 that defines a top and bottom opening and two ball bearings 102, as shown in FIG. 10. FIG. 11 shows shaft pin 111 included in the shaft assembly, which is guided inside the shaft through the shaft openings when the shaft assembly is put together. FIG. 12 shows the shaft to tab force surface 121 and tab limit surfaces 122. Force surface 121 is the surface that comes in contact with the tab, and is one of the links for transferring the force from the tab. Surfaces 122 are guides for the tab to ensure movement in the Z-axis only.

The shaft assemblies allow the force to transfer from the float mechanism base 1 (cantilever force) to the tab 4 with minimal friction due to ball bearings 102. The tab limit surfaces 122 act as a secondary guidance to tab 4. The shaft to tab force surface 121 diameter can be configured to control the forces in the float mechanism.

Figure 13:
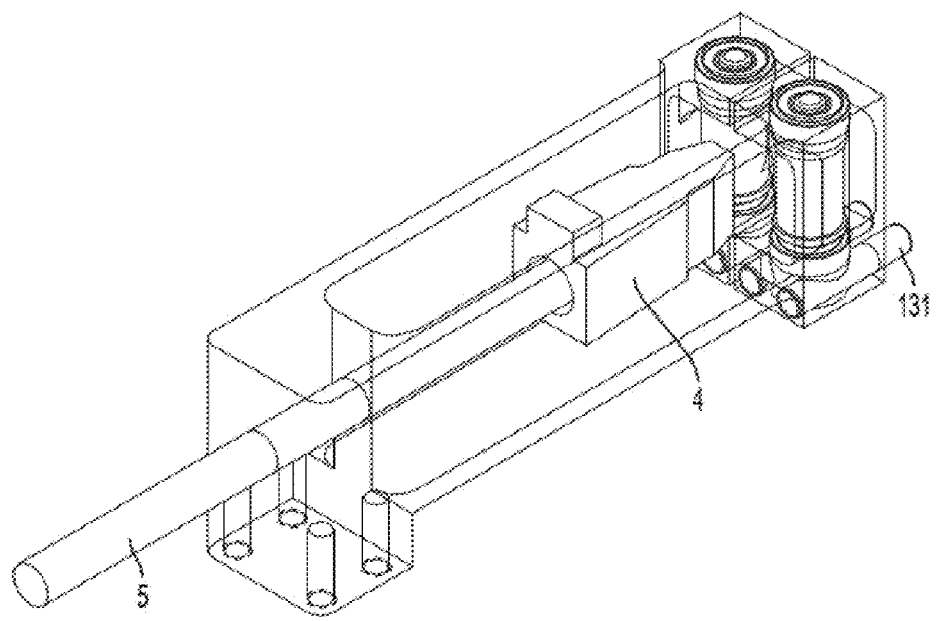
FIGS. 13-16 are exemplary illustrations of assembling a controlled independent float mechanism according to embodiments of the present invention.

FIGS. 13-17 provide details of exemplary assembly of the components of the float mechanism according to embodiments of the present invention. Specifically, FIG. 13 shows an exemplary assembled view of the float mechanism. FIG. 13 shows the shaft assemblies placed in the float mechanism base, the back pin 5, the tab 4, and shaft assembly retaining pins 131. Shaft assembly retaining pins 131 secure the shaft assemblies 100 within the float mechanism base.

Figure 14:
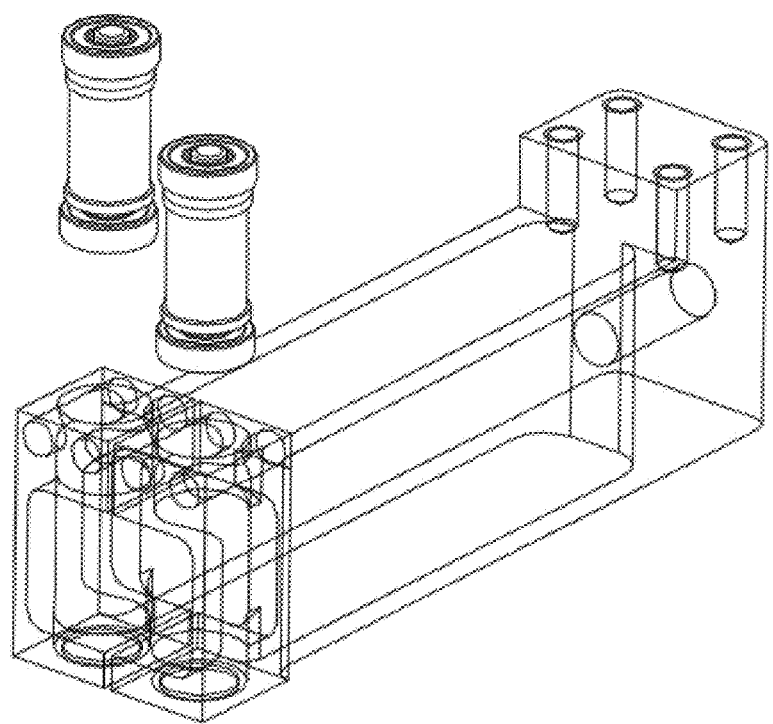

FIG. 14 shows a first step of the assembly sequence of the float mechanism. According to embodiments of the present invention, the first step can include the insertion of the pre-assembled shaft assemblies into the float mechanism base from the bottom side.

Figure 15:
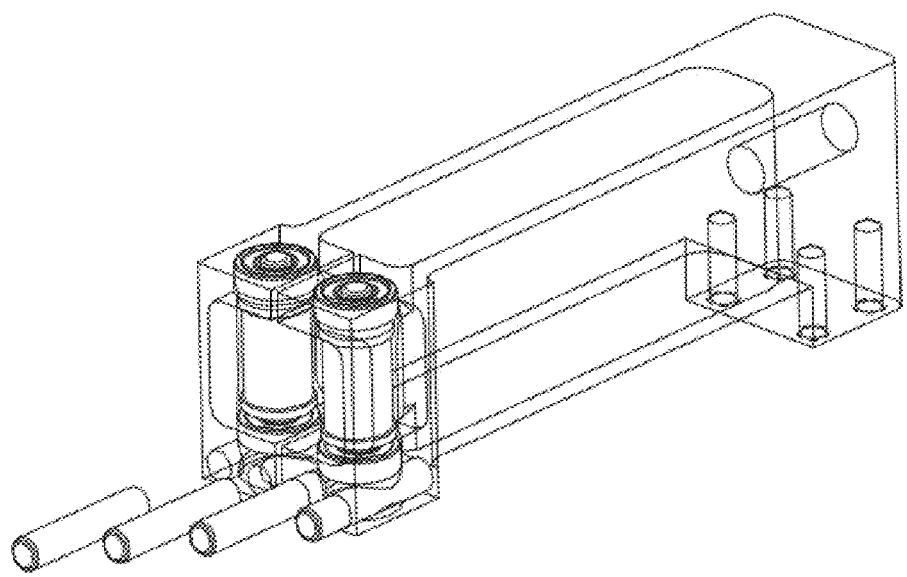

FIG. 15 shows a second step of the assembly sequence. The second step can include the insertion of the four retaining pins 131 into their appropriate openings.

Figure 16:
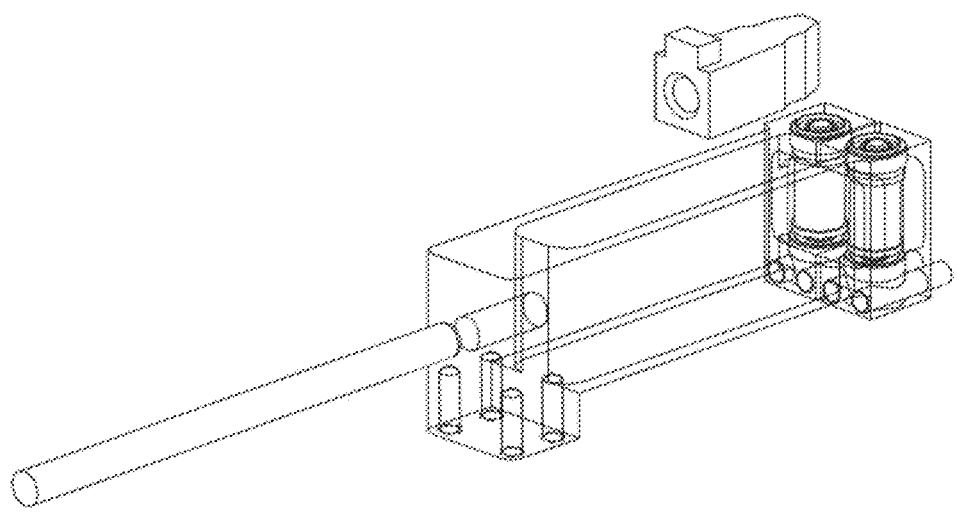

FIG. 16 shows a third step of the assembly sequence. The third step can include the insertion of the back pin 5 through opening 11 in the back of the mechanism and into the hole in tab 4.

Figure 17:
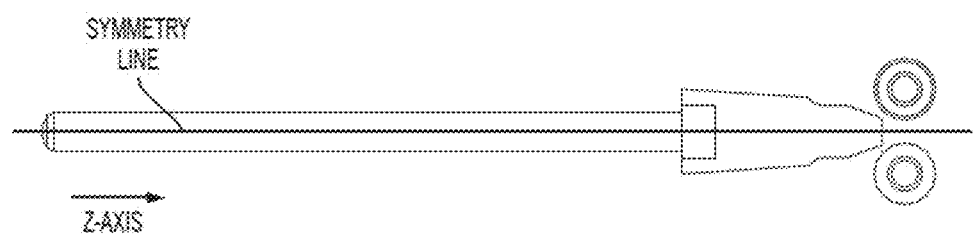
FIGS. 17-21 are exemplary illustrations of forces and displacements of the parts of a controlled independent float mechanism according to embodiments of the present invention.

FIGS. 17-21 provide explanations of the forces and displacements related to the float mechanism. Specifically, FIG. 17 shows a diagram with the relative positions of the back pin, tab and the two shaft assemblies before preloading the float mechanism. When the back pin is pressed towards the Z-axis direction, the tab preload insertion chamfer surfaces touch the two shafts. The force in the Z-axis makes the two shafts roll on the chamfer surfaces of the tab, resulting in the shafts becoming more distant between them. At this point, the two cantilevers of the base start spreading, which loads the cantilevers with bending force.

Figure 18:
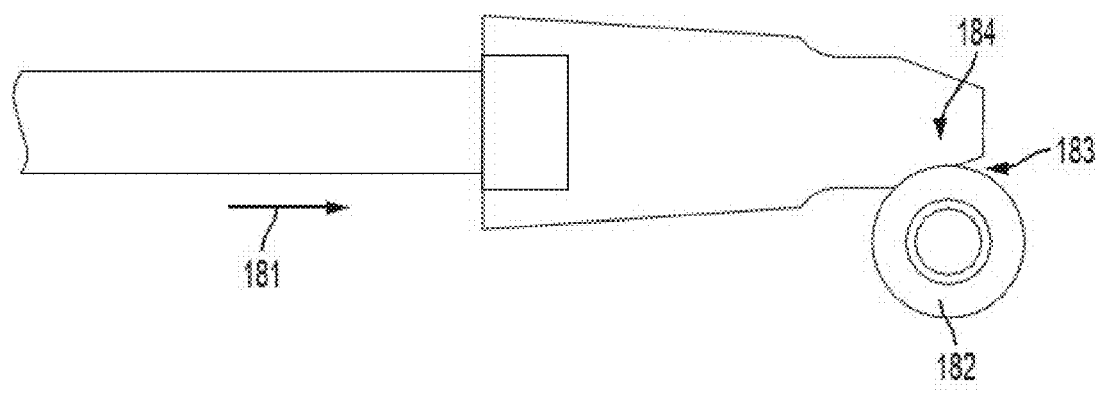

FIG. 18 shows an exemplary force diagram. Specifically, FIG. 18 shows the direction of a back pin force 181, a cantilever force on the shaft 182, a first shaft force on the Z-axis 183, and a second shaft force 184, perpendicular to a tab surface.

For ease of reference, the force transferred from the cantilevers to the shafts is, herein referred to as "cantilever force," the force transferred from the shaft to the tab in a perpendicular direction to the Z-axis direction is, herein referred to as "shaft force," and the shaft force component in the Z-axis, is herein, referred to as "shaft Z-axis force."

As described above, as the two cantilevers spread they act as springs, and they transfer this spring force to the two shafts approximately perpendicularly to the symmetry line. Since there is a symmetry line around the Z-axis, the only component relevant to the tab's displacement is the shaft Z-axis force. Increasing the back pin force disturbs the force equilibrium in the Z-axis. The tab moves along the Z-axis, which increases the distance between the two shafts. As a result, the cantilevers are spread more and the shaft Z-axis force increase.

This continues until the shafts reach the preload surfaces, when at this point the shaft Z-axis force becomes zero. The cantilever forces are greater than zero since they are spread.

Figure 19:
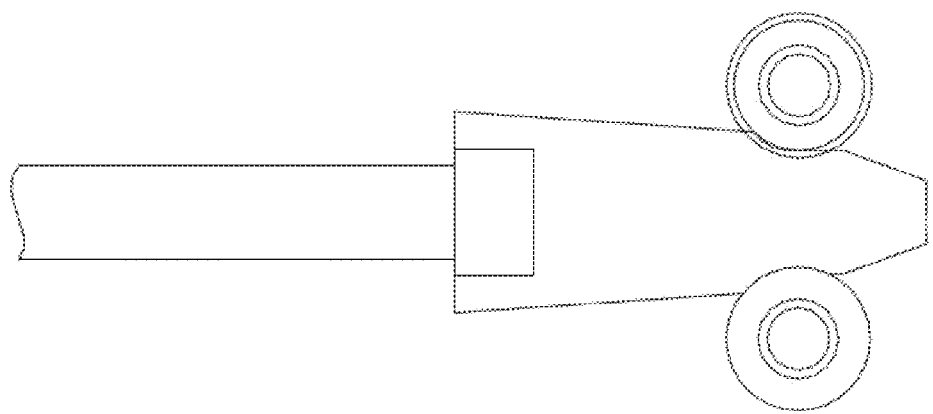

Next the shafts reach the tab's float force surfaces, which is the natural position of the float mechanism, as shown in FIG. 19.

An optical connector/adaptor can be connected to the back pin when in the mechanism is in the natural position.

Mating an optical connector requires force in the Z-axis in order to latch it. When this force is applied to the connector/adaptor the force is transferred to the back pin. The shaft float force surface and the cantilever design are determined according to the force needed to latch the optical connector/adaptor.

In order to reach an optical latch, the shaft Z-axis force must be greater than the designed optical latching force (which is individual in each optical connector/adaptor).

Figure 20:
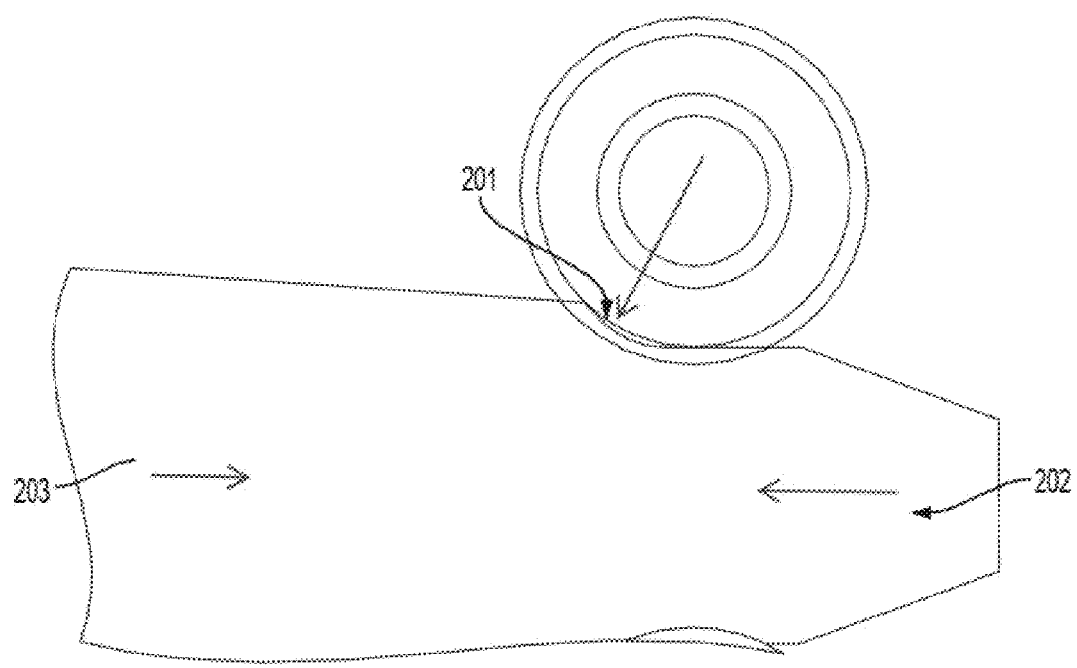

FIG. 20 shows the directions of the back pin force 203, the shaft Z-axis force 202, and the shaft force 201, when the float mechanism is in the natural position.

Figure 21:
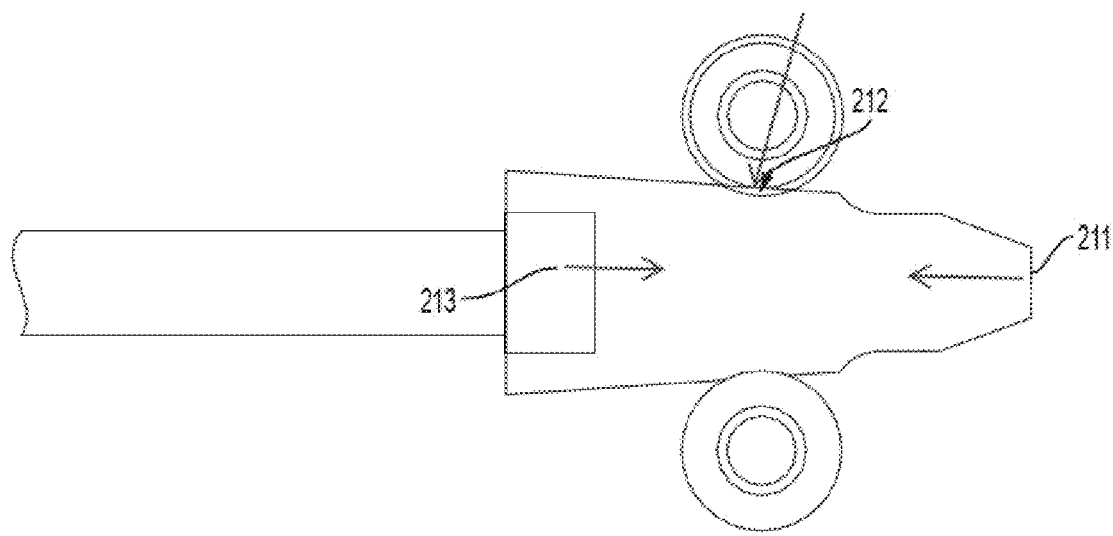

FIG. 21 shows the directions of the back pin force 213, the residual force 211, and the shaft force 212, when the float mechanism leaves the natural position into the "float" position. Only when the back pin force surpasses the shaft Z-axis force (greater than the optical latching force) will the shafts start rolling on the tab float force surface. After rolling over the float force surface, the float mechanism will go to the "float" position. The two shafts are now rolling against the tab's residual force surface. This surface's angle β can be determined by the desired residual force in accordance to the specific application and is usually small and could be 0°. The residual force is able to return the mechanism to the natural position, where the shafts rest against tab preload surface. Since there is very little friction in the mechanism, the force could be very small.

The force can also remain zero if there is a retaining part which returns the mechanism to its natural position.

Figure 22:
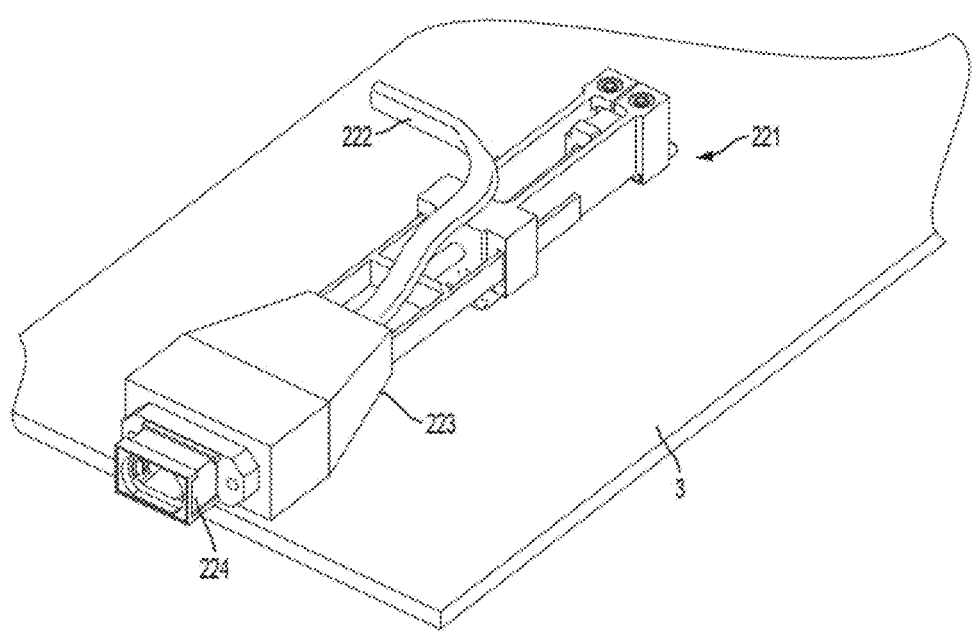
FIGS. 22-28 are exemplary illustrations of a float mechanism with different types of adaptors according to embodiments of the present invention.
Figure 23:
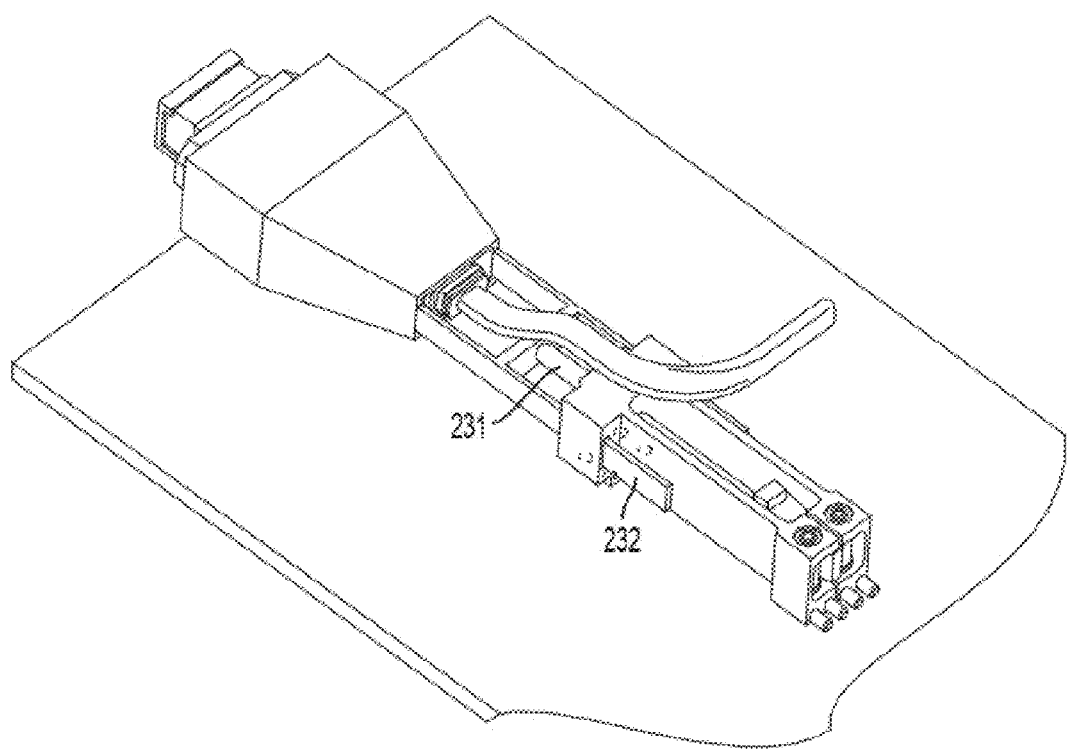
Figure 24:
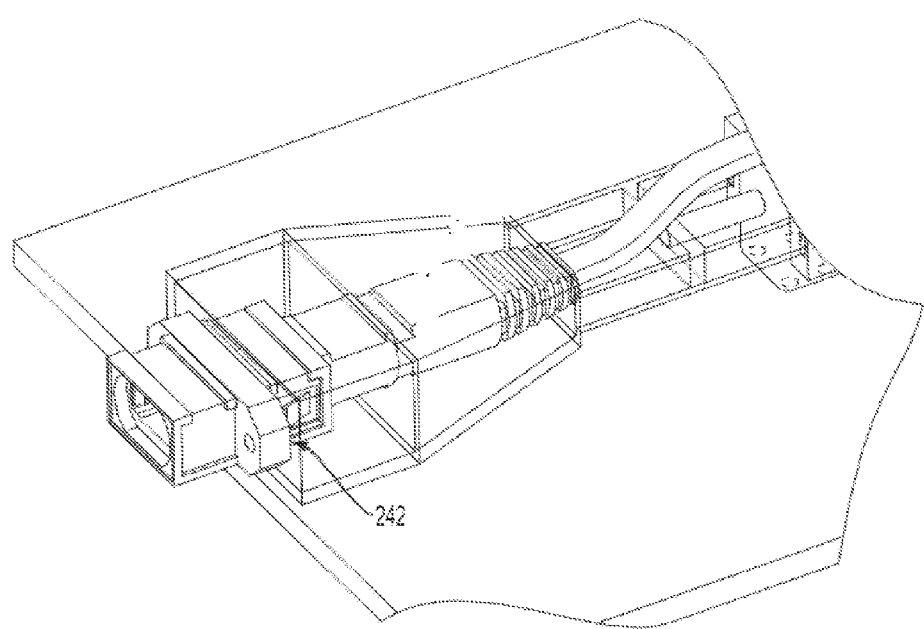

FIGS. 22-28 provide examples of the float mechanism being connected to different connectors. Specifically, FIGS. 22-24 illustrate an example of the float mechanism connected to a standard MTP/MPO (Multiple-Fibre Push-On/Pull-off) optical fiber adaptor 224. FIG. 22 shows the float mechanism 221 on the substrate 3, connected through an MTP guiding adaptor 223, to an MTP adaptor 224. The patch cord 222 is connected to the MTP guiding adaptor 223. MTP adaptor 224 is a standard panel mounted adaptor, which is not capable to function as a backplane adaptor. Using the float mechanism 221 with a guiding adaptor 223, the MTP adaptor 224 can function as a backplane connector.

FIG. 23 shows details of the mechanism and the connection. Guide 232 provides guidance on the Z-axis and the connection point 231 between the guide 232 and the float mechanism 221 allows certain degrees of freedom to the connector.

FIG. 24 shows the connection 242 of the MTP/MPO connector with the guiding adaptor 223. The Z-axis movement is determined by the float mechanism 221, while all the degrees of freedom are provided by the guiding adaptor 223 in two places: 1) at the connection 231 with the float mechanism 221, and 2) at the connection 242 with MTP adaptor 224. The degrees of freedom can be determined by the MTP adaptor's design. According to other embodiments of the present invention, the guide adaptor 223 can additionally include guidance for the daughter card side of the connection.

Figure 25:
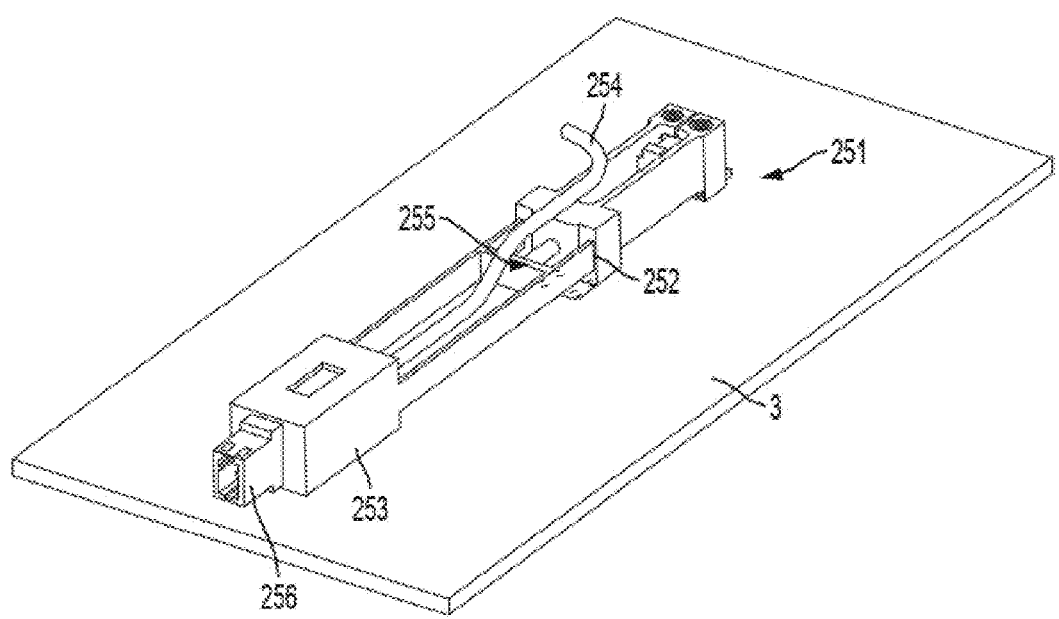
Figure 26:
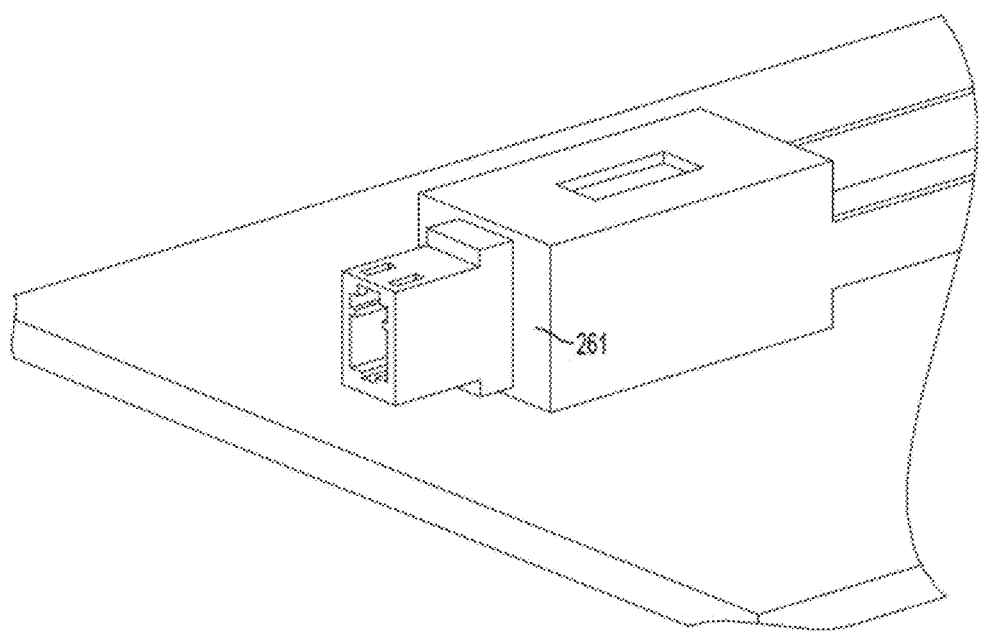

FIGS. 25-26 illustrate an example of the float mechanism connected to a standard LC (Lucent Connector/Little Connector) Simplex optical fiber adaptor 256. FIG. 25 shows the float mechanism 251 on the substrate 3, connected through an LC Simplex guiding adaptor 253, to an LC Simplex adaptor 256. The optic fiber 254 is connected to the LC Simplex adaptor 256. Guide 252 provides guidance on the Z-axis and the connection point 255 between the guide 252 and the float mechanism 251 allows certain degrees of freedom to the LC Simplex adaptor 256. FIG. 26 shows the connection 261 of the LC Simplex adaptor 256 with the guiding adaptor 253.

LC Simplex adaptor 256 is a standard panel mounted adaptor, which is not capable to function as a backplane adaptor. Using the float mechanism 251 with a guiding adaptor 253, the LC Simplex adaptor 256 can function as backplane connector.

The Z-axis movement is determined by the float mechanism 251, while all the degrees of freedom are provided by the guiding adaptor 253 in two places: 1) at the connection with the float mechanism 231, and 2) at the connection 261 with LC Simplex adaptor 256. The degrees of freedom can be determined by the LC Simplex adaptor's design. According to other embodiments of the present invention, the guide adaptor 253 can additionally include guidance for the daughter card side of the connection.

Figure 27:
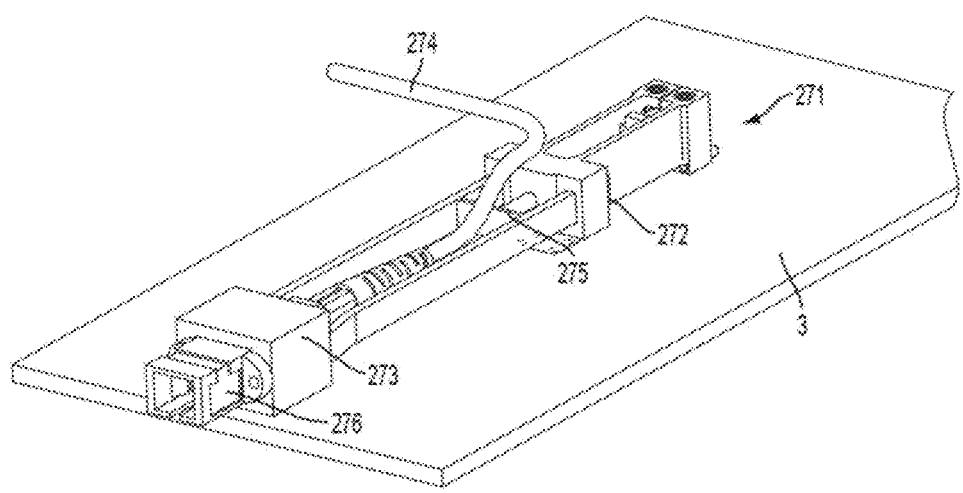
Figure 28:
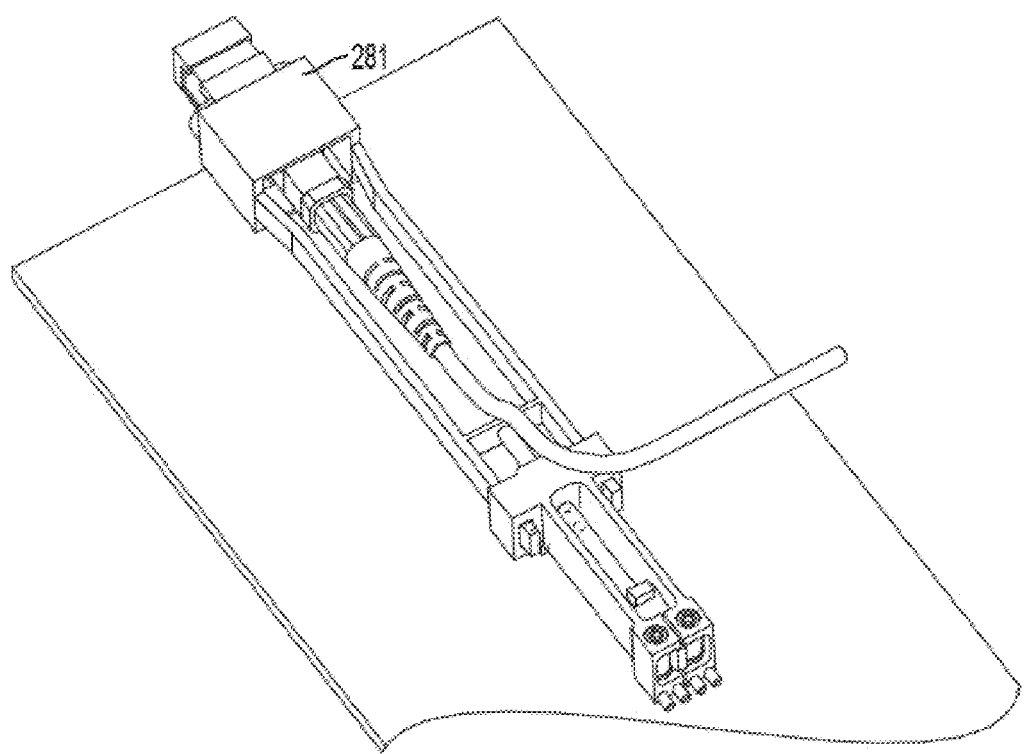

FIGS. 27-28 illustrate an example of the float mechanism connected to a standard SC (Subscriber Connector or square connector or Standard Connector) optical fiber adaptor 276. FIG. 27 shows the float mechanism 271 on the substrate 3, connected through an SC guiding adaptor 273, to an SC adaptor 276. The optic fiber 274 is connected to the SC adaptor 276. Guide 272 provides guidance on the Z-axis and the connection point 275 between the guide 272 and the float mechanism 271 allows certain degrees of freedom to the SC adaptor 276. FIG. 28 shows the connection 281 of the SC adaptor 276 connector with the guiding adaptor 273.

SC adaptor 276 is a standard panel mounted adaptor, which is not capable to function as a backplane adaptor. Using the float mechanism 271 with a guiding adaptor 273, the SC adaptor 276 can function as a backplane connector.

The Z-axis movement is determined by the float mechanism 271, while all the degrees of freedom are provided by the guiding adaptor 273 in two places: 1) at the connection 275 with the float mechanism 271, and 2) at the connection 281 with SC adaptor 276. The degrees of freedom can be determined by the SC adaptor's design. According to other embodiments of the present invention, the guide adaptor 273 can additionally include guidance for the daughter card side of the connection.

While the invention has been described with respect to a limited number of embodiments, it will be appreciated that many variations, modifications and other applications of the invention may be made. It will further be appreciated that the invention is not limited to what has been described hereinabove merely by way of example. Rather, the invention is limited solely by the claims which follow.

The invention claimed is:

1. A float mechanism for controlling an optical connector comprising:
    a pin having a first end and a second end;
    a first shaft assembly and a second shaft assembly;
    a base disposed at a distance from the optical connector such that the base is not in direct contact with the optical connector, the base comprising:
        a first cantilever and a second cantilever; and
        a housing having a first side and a second side, the first side connected to the first cantilever and the second side connected to the second cantilever, the housing defining an opening configured to receive the pin and the housing further defining a plurality of threads configured to receive securing pins for securing the float mechanism to a substrate;
        the base defining a first shaft assembly opening for receiving the first shaft assembly and a second shaft assembly opening for receiving the second shaft assembly, the first and second shaft assembly openings positioned on the opposite ends of the first and second cantilevers from the first and second housing sides, respectively; and
    a tab comprising a first and second preload surface, a first and second float force surface, a first and second residual force surface and a first and second preload chamfer, the tab configured to receive the first end of the pin;
    wherein the float mechanism is configured to control the optical connector by receiving the tab and the first end of the pin within the housing so that, when the optical connector is pushed in the direction of the float mechanism, the tab interacts with the first and second shaft assemblies by pushing the first and second shaft assemblies outward from the tab, causing the cantilevers to flex outward and provide a biasing inward force that pushes the first end of the pin back toward the optical connector while the second end of the pin interacts with components of the optical connector distant from the base.

2. The float mechanism of claim 1, wherein the first shaft assembly is configured to touch the first float force surface and the second shaft assembly is configured to touch the second float force surface, when the float mechanism is in a first state.

3. The float mechanism of claim 2, wherein the first shaft assembly is configured to touch the first residual force surface and the second shaft assembly is configured to touch the second residual surface, when the float mechanism is in a second state.

4. The float mechanism of claim 3, wherein the first and second cantilevers are configured to return the tab to the first state, when the float mechanism is in the second state.

5. The float mechanism of claim 1, wherein the second end of the pin is connected to an optical connector adaptor.

6. The float mechanism of claim 1, wherein when force is applied at the second end of the pin towards the first end of the pin pressure is moved through the pin to the tab and at the first and second shaft assemblies.

7. The float mechanism of claim 6, wherein the pressure at the first and second shaft assemblies bends the first and second cantilever towards opposite directions.

8. The float mechanism of claim 1, wherein the plurality of threads receives securing pins for securing the float mechanism to a substrate.

9. The float mechanism of claim 1, the base further defining a plurality of pin openings for receiving a plurality of retaining pins.

10. The float mechanism of claim 9, wherein the plurality of retaining pins secure the first and second shaft assemblies.

11. A method for controlling an optical connector comprising:
    providing a float mechanism that comprises:
        a pin having a first end and a second end;
        a first shaft assembly and a second shaft assembly;
        a base disposed at a distance from the optical connector such that the base is not in direct contact with the optical connector, the base comprising:
            a first cantilever and a second cantilever; and
            a housing having a first side and a second side, the first side connected to the first cantilever and the second side connected to the second cantilever, the housing defining an opening configured to receive the pin and the housing further defining a plurality of threads configured to receive securing pins for securing the float mechanism to a substrate;
            the base defining a first shaft assembly opening for receiving the first shaft assembly and a second shaft assembly opening for receiving the second shaft assembly, the first and second shaft assembly openings positioned on the opposite ends of the first and second cantilevers from the first and second housing sides, respectively; and a tab comprising a first and second preload surface, a first and second float force surface, a first and second residual force surface and a first and second preload chamfer, the tab configured to receive the first end of the pin; and controlling the optical connector with the float mechanism by:

receiving the tab and the first end of the pin within the housing so that, when the optical connector is pushed in the direction of the float mechanism, the tab interacts with the first and second shaft assemblies by pushing the first and second shaft assemblies outward from the tab, causing the cantilevers to flex outward and provide a biasing inward force that pushes the first end of the pin back toward the optical connector, and connecting the optical connector to the second end of the pin distant from the base.

12. The method for controlling an optical connector of claim 11, wherein the first shaft assembly is configured to touch the first float force surface and the second shaft assembly is configured to touch the second float force surface, when the float mechanism is in a first state.

13. The method for controlling an optical connector of claim 12, wherein the first shaft assembly is configured to touch the first residual force surface and the second shaft assembly is configured to touch the second residual surface, when the float mechanism is in a second state.

14. The method for controlling an optical connector of claim 13, wherein the first and second cantilevers are configured to return the tab to the first state, when the float mechanism is in the second state.

15. The method for controlling an optical connector of claim 11, wherein the second end of the pin is connected to an optical connector adaptor.

16. The method for controlling an optical connector of claim 11, wherein when force is applied at the second end of the pin towards the first end of the pin pressure is moved through the pin to the tab and at the first and second shaft assemblies.

17. The method for controlling an optical connector of claim 16, wherein the pressure at the first and second shaft assemblies bends the first and second cantilever towards opposite directions.

18. The method for controlling an optical connector of claim 11, wherein the plurality of threads receives securing pins for securing the float mechanism to a substrate.

19. The method for controlling an optical connector of claim 11, the base further defining a plurality of pin openings for receiving a plurality of retaining pins.

20. The method for controlling an optical connector of claim 19, wherein the plurality of retaining pins secure the first and second shaft assemblies.

* * * * *